Feb. 19, 1929.
W. S. BRUBAKER
1,702,762
JOINT FOR FLUID METERS AND THE LIKE
Filed Feb. 25, 1927
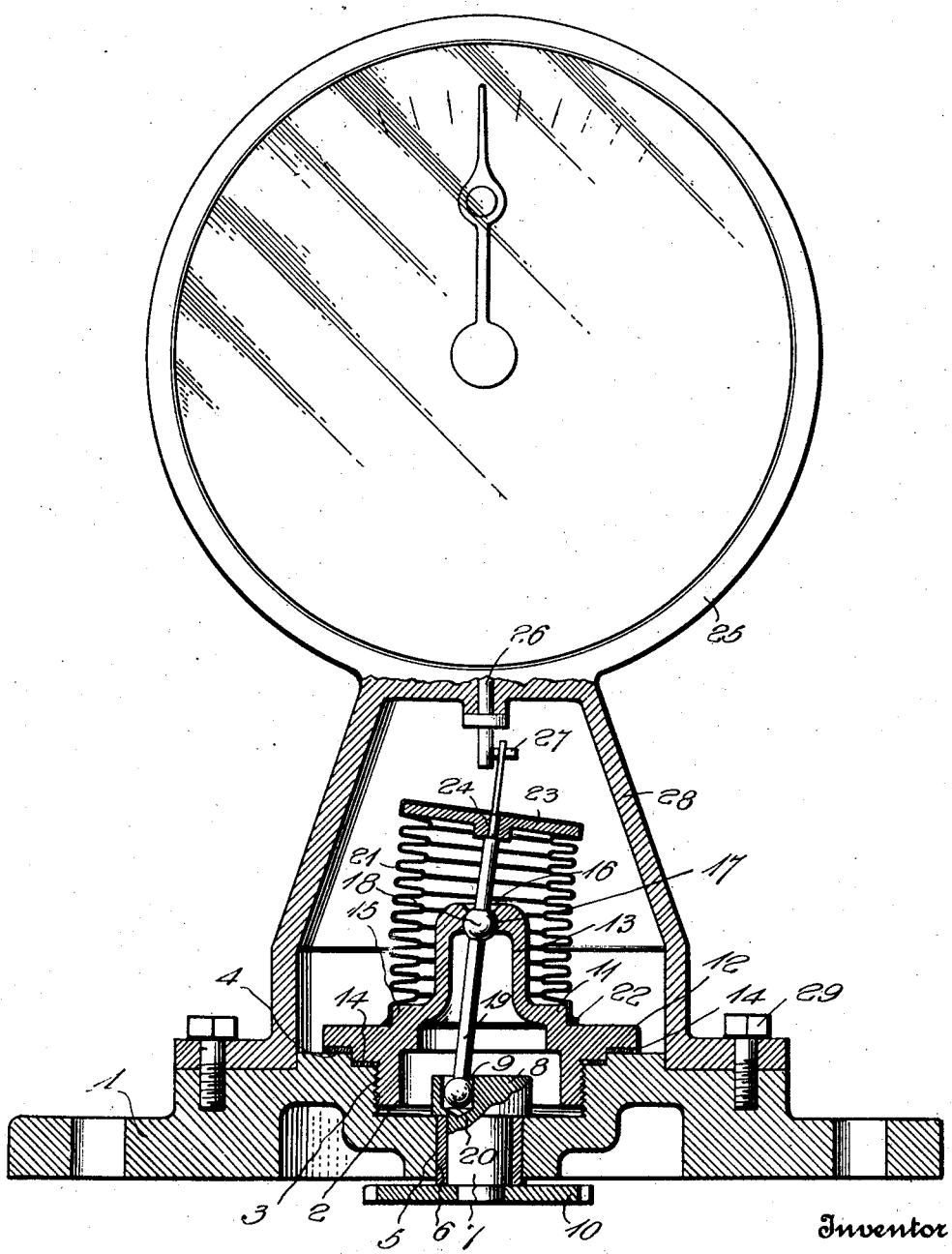
Inventor
Walter S. Brubaker,
Attorney Patented Feb. 19, 1929.

1,702,762

UNITED STATES PATENT OFFICE.

WALTER S. BRUBAKER, OF OAKLAND, CALIFORNIA.

JOINT FOR FLUID METERS AND THE LIKE.

Application filed February 25, 1927. Serial No. 170,878.

The invention relates to joints for the purpose of transmitting motion without leakage from the interior of the casing of a fluid meter or similar machine to an external mechanism such as a counter or register. More specifically, the invention comprises means for driving the register and for fluid-tightly sealing the meter casing at the point where a part of the register driving means (a nutating shaft) passes to the exterior thereof. For this purpose, numerous arrangements of diaphragms and packings have heretofore been devised with more or less success, but it is the aim of my invention to provide a new and improved construction in which I may effectively utilize a cylindrical bellows to seal the meter casing against leakage around the ball mounting of a nutating shaft which engages and drives the counter or register.

The cylindrical bellows is a thin, metal bellows longitudinally corrugated and hence rendered very flexible without danger of breakage, and in numerous arts this bellows has been used with great success, but in so far as I am advised, no practical construction has heretofore been devised whereby such bellows may be advantageously used in connection with a meter and the register driving means thereof, embodying a nutating shaft. There is a need however for such an improved construction and my invention aims to fulfill such need.

With the foregoing in view, the invention resides in the novel subject matter hereinafter described and claimed, the description being supplemented by the accompanying drawing which is a vertical sectional view partly in elevation showing the invention and associated parts.

In the drawing above briefly described, the numeral 1 designates a base which constitutes a part of one side of a meter casing and it may be the cover plate of an opening in such casing. The top of this base is formed with a recess 2 of circular form, said recess having a threaded side wall 3 and being preferably enlarged at its open upper end, as indicated at 4. At the center of this recess, the base 1 is formed with a bearing opening 5 which is preferably equipped with an appropriate bushing 6. A driving shaft 7 is disposed within the bushing 6 and is provided at its upper end with a head 8 located in the central portion of the recess 2, said head having an excentrically positioned ball socket 9. The motion of the shaft 7 is imparted to the registering or indicating mechanism, and it is, of course, driven by the metering mechanism in any suitable manner, a gear 10 being shown.

A cap 11 is provided for the recess 2, said cap preferably consisting of a ring 12 threaded into said recess around the head 8 and a dome 13 integral with the ring. This ring 12 is preferably provided with a stepped upper portion, one step of which is received in the enlargement 4 of the recess 2, appropriate gaskets 14 being provided between the steps and the underlying base portions, to obtain a fluid-tight connection.

At its lower end, the dome 13 is preferably enlarged, providing a continuous, peripherally facing shoulder 15 at the juncture of the dome with the ring 12 and spaced outwardly from the major portion of said dome. The upper end of this dome is formed with an opening 16 embodying a ball socket 17. Rotatably and rockably received in this socket, is a ball 18 on the intermediate portion of a nutating shaft 19, the lower end of said shaft having a ball 20 which is received in the socket 9 of the head 8.

A cylindrical bellows 21 surrounds the dome 13 and is outwardly spaced from the major portion of this dome, the lower end of said bellows surrounding and being soldered or otherwise secured at 22 to the shoulder 15, establishing a fluid-tight connection. The upper end of the bellows 21 is closed fluid-tightly and is secured to the shaft 23 above the dome 17, in a fluid-tight manner. Preferably, a disk 23 closes the upper end of the bellows 21 and may be soldered to it, said disk having a central screw-threaded opening 24 to engage threads on the shaft 19. If desired, solder or the like may be employed to secure the disk and shaft together.

25 designates in a general way, a counter or register having a driven shaft 26 provided with a pin or the like 27 which is engaged by the upper end of the shaft 19 to be operated thereby. The casing of the register is provided with a hollow base 28 which encases the cap 11, the cylindrical bellows 21, the upper portion of the shaft 19 and the lower portion of the shaft 26, said base 28 being secured by bolts or the like 29 upon the base 1.

By employing the novel construction shown and described or a substantial equivalent thereof, easy assembly and disassembly of all parts is permitted, the meter casing is effectively sealed against escape of fluid at the point where the nutating shaft 19 must pass to the exterior of said casing, and a generally desirable and efficient structure is produced. The cylindrical bellows 21 is readily yieldable in all directions with the travel of the shaft 19 and the movement and consequent yielding of said bellows are trivial, so that the bellows will last indefinitely, providing substantially a permanent seal.

As excellent results are obtainable from the details disclosed, such details are preferably followed. However, within the scope of the invention as claimed, variations may of course be made.

I claim:—

1. A joint for the driving connection between a meter and its register comprising a base having a bearing opening, a driving shaft in said opening, a hollow dome-shaped member detachably secured to the base opposite the driving shaft and having an opening embodying a ball socket, a nutating shaft having a ball between its ends rotatably and rockably held in said ball socket, a driving connection between the nutating shaft and the said driving shaft, a disk secured to the nutating shaft, a flexible metal bellows enclosing said dome-shaped member and a portion of said nutating shaft, said metal bellows being secured at one end to the disk and at its other end to the base of the dome-shaped member.

2. A joint for the driving connection between a meter and its register comprising a base having a circular recess in its upper side provided with a threaded wall, said base also having a bearing opening at the center of the recess bottom, a driving shaft passing through said opening and having a head disposed in the recess, the upper side of said head having an eccentric socket, a cap for the recess consisting of a ring threaded into said recess around said head and having an integrally attached dome whose upper end is formed with a central opening embodying a ball socket, a nutating shaft having a ball between its ends rotatably and rockably held in said ball socket of the dome, the lower end of said nutating shaft being provided with a ball received in the aforesaid socket of said driving shaft, and a flexible metal bellows surrounding said dome and spaced outwardly therefrom, the upper end of said bellows being closed and fluid-tightly secured to said nutating shaft above the dome, the lower end of said bellows being fluid-tightly secured to a portion of the aforesaid cap.

3. A joint for the driving connection between a meter and its register, comprising a base having a circular recess in its upper side provided with a threaded wall, said base also having a bearing opening at the center of the recess bottom, a driving shaft passing through said opening and having a head disposed in the recess, the upper side of said head having an eccentric socket, a cap for the recess consisting of a ring threaded into said recess around said head and having an integrally attached dome whose upper end is formed with a central opening embodying a ball socket, the lower end of said dome being enlarged and providing a continuous outwardly facing shoulder at the juncture of the dome and ring, a nutating shaft having a ball between its ends rotatably and rockably held in said ball socket of the dome, the lower end of said nutating shaft being provided with a ball received in the aforesaid socket of said driving shaft, and a flexible metal bellows surrounding said dome and spaced outwardly therefrom, the upper end of said bellows being closed and fluid-tightly secured to said nutating shaft above the dome, the lower end of said bellows being fluid-tightly secured around the aforesaid shoulder.

In testimony whereof I have hereunto affixed my signature.

WALTER S. BRUBAKER.